(12) United States Patent
O'Donnell et al.

(10) Patent No.: US 11,234,373 B2
(45) Date of Patent: Feb. 1, 2022

(54) CROP FLOW GUIDE VANES

(71) Applicant: CNH Industrial America LLC, New Holland, PA (US)

(72) Inventors: Shaun A. O'Donnell, Lititz, PA (US); Joshua A. Lesher, Hamburg, PA (US); Frank R. G. Duquesne, Zwevegem (BE); Clinton T. Baltz, Lincoln University, PA (US)

(73) Assignee: CNH Industrial America LLC, New Holland, PA (US)

( * ) Notice: Subject to any disclaimer, the term of this patent is extended or adjusted under 35 U.S.C. 154(b) by 231 days.

(21) Appl. No.: 16/539,076

(22) Filed: Aug. 13, 2019

(65) Prior Publication Data

US 2021/0045293 A1    Feb. 18, 2021

(51) Int. Cl.
| | |
|---|---|
| *A01F 12/10* | (2006.01) |
| *A01D 41/12* | (2006.01) |
| *A01F 7/06* | (2006.01) |
| *A01F 12/24* | (2006.01) |

(52) U.S. Cl.
CPC .............. *A01F 12/10* (2013.01); *A01D 41/12* (2013.01); *A01F 7/067* (2013.01); *A01F 12/24* (2013.01)

(58) Field of Classification Search
CPC .......... A01F 12/10; A01F 7/067; A01F 12/24; A01F 7/02; A01D 41/12; A01D 61/008
See application file for complete search history.

(56) References Cited

U.S. PATENT DOCUMENTS

| | | | |
|---|---|---|---|
| 3,034,513 A | * | 5/1962 | Ausherman ............. A01F 12/18 460/71 |
| 4,244,380 A | | 1/1981 | DePauw et al. |
| 4,258,726 A | | 3/1981 | Glaser et al. |
| 4,328,815 A | * | 5/1982 | Rowland-Hill ......... A01F 12/10 460/16 |
| 4,739,773 A | * | 4/1988 | West ..................... A01F 12/442 460/113 |

(Continued)

FOREIGN PATENT DOCUMENTS

DE          3601359 A1     7/1987

OTHER PUBLICATIONS

Extended European Search Report for EP Application No. 20190778.9 dated Jan. 13, 2021 (seven pages).

*Primary Examiner* — Arpad Fabian-Kovacs
(74) *Attorney, Agent, or Firm* — Peter Zacharias; Patrick Sheldrake

(57) ABSTRACT

An agricultural vehicle crop feeder system having housings defining a crop passage, a conveyor assembly, a rotor, a guide plate, and one or more guide vanes extending from the guide plate. The conveyor assembly propels crop material along a feeder flow direction to the rotor. The rotor has inlet vanes that receive the crop material in a receiving region located below the rotor's axis. The leading edges of the rotor inlet vanes travel towards the receiving region on a first transverse side of the rotor axis and away from the receiving region on a second transverse side of the rotor axis. The guide plate is adjacent the receiving region. The guide vane extends into the crop passage on the first side of the rotor axis, and angled relative to the flow direction with its trailing edge closer to the first rotor axis, in the transverse direction, than the leading edge.

20 Claims, 4 Drawing Sheets

(56) References Cited

U.S. PATENT DOCUMENTS

| | | | | |
|---|---|---|---|---|
| 4,875,890 A | * | 10/1989 | Margerum | A01F 7/06 |
| | | | | 460/68 |
| 5,083,977 A | * | 1/1992 | Coers | A01F 12/44 |
| | | | | 460/71 |
| 5,454,758 A | | 10/1995 | Tophinke et al. | |
| 5,556,337 A | | 9/1996 | Tophinke et al. | |
| 6,517,431 B2 | * | 2/2003 | Schwersmann | A01F 7/06 |
| | | | | 460/16 |
| 7,473,170 B2 | | 1/2009 | McKee et al. | |
| 8,231,446 B2 | | 7/2012 | Pope et al. | |
| 8,556,690 B2 | | 10/2013 | Bojsen et al. | |
| 8,926,415 B2 | * | 1/2015 | Farley | A01F 7/067 |
| | | | | 460/107 |
| 9,706,714 B2 | * | 7/2017 | Bussmann | A01D 41/12 |
| 9,788,491 B2 | * | 10/2017 | Duquesne | A01F 12/18 |
| 10,058,035 B2 | | 8/2018 | Kemmerer et al. | |
| 2009/0111547 A1 | * | 4/2009 | Pope | A01F 7/067 |
| | | | | 460/80 |
| 2011/0320087 A1 | | 12/2011 | Farley et al. | |
| 2013/0137492 A1 | * | 5/2013 | Biggerstaff | A01F 12/28 |
| | | | | 460/62 |
| 2015/0141097 A1 | * | 5/2015 | Regier | A01F 12/28 |
| | | | | 460/80 |
| 2018/0153104 A1 | | 6/2018 | Matousek et al. | |
| 2021/0051853 A1 | * | 2/2021 | Ricketts | A01F 12/26 |

* cited by examiner

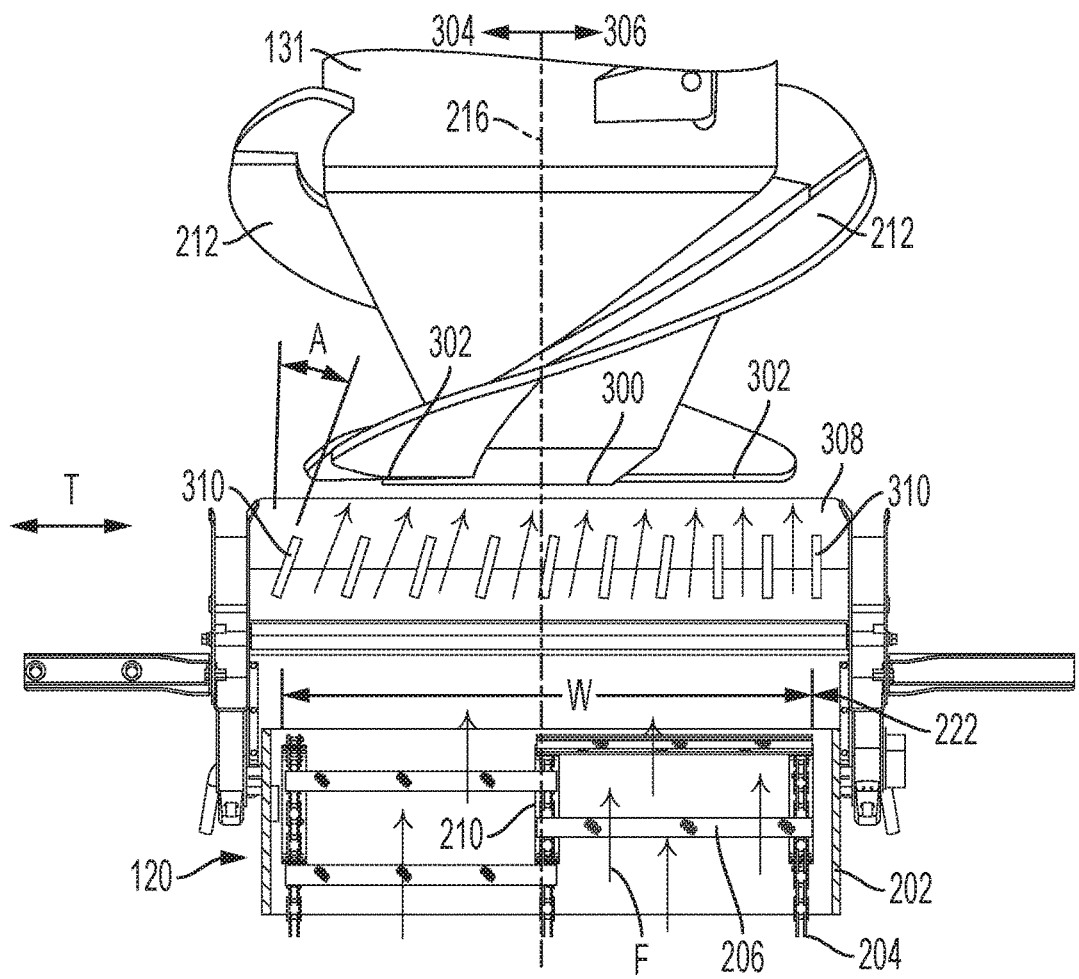
FIG. 3
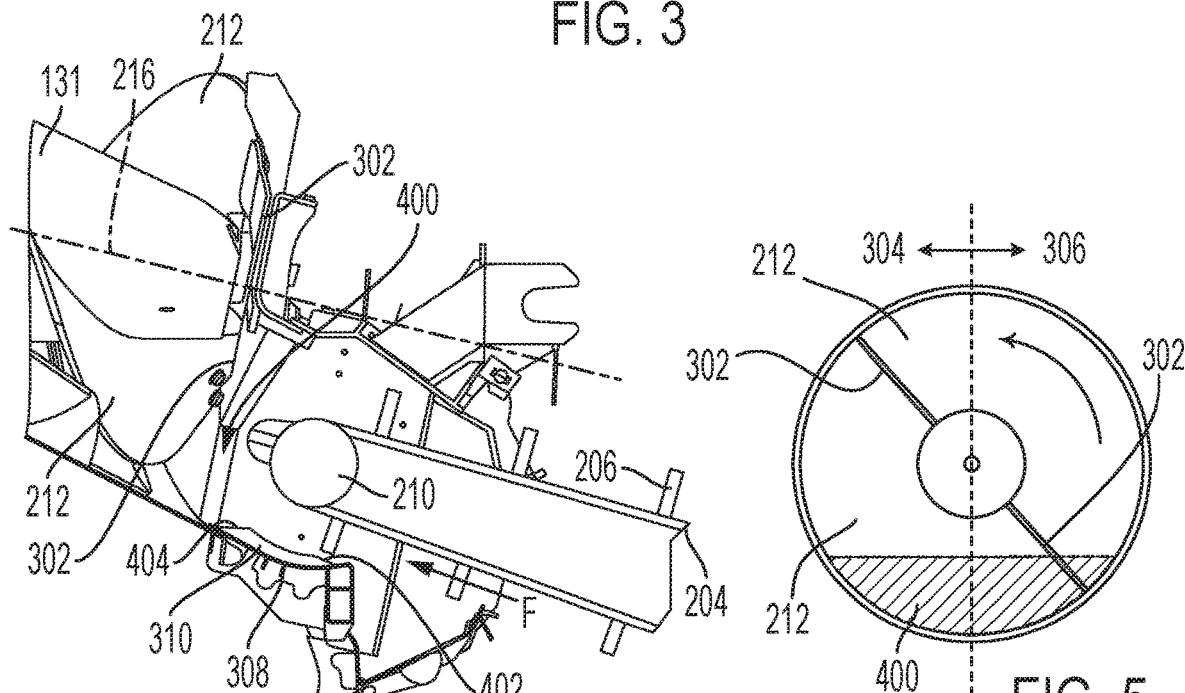
FIG. 4
FIG. 5

CROP FLOW GUIDE VANES

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of material from the ground, and moves the material towards the feeder. The feeder conveys the consolidated crop materials to the threshing and separating system, which separates the desirable crop from the remaining material.

In a typical axial flow combine system, the threshing and separating system has a rotor that spins about a rotor axis that is aligned along the length of the combine. The inlet to the rotor faces the outlet of the feeder, and the rotor includes helical inlet vanes that receive the crop material and push it backwards towards the rest of the rotor. The feeder typically comprises a conveyor assembly that ends at a location vertically below the rotor axis, and extends across the width of the rotor at that location. The conveyor assembly carries the crop material in a parallel flow and ejects it across the width of the helical inlet vanes at the entrance location, in a manner referred to as "face feeding."

This description of the background is provided to assist with an understanding of the following explanations of exemplary embodiments, and is not an admission that any or all of this background information is necessarily prior art.

SUMMARY OF THE INVENTION

In one exemplary aspect, there is provided a crop feeder system for an agricultural vehicle. The crop feeder system includes one or more housings defining a crop passage, a conveyor assembly, a first rotor, a first guide plate, and at least one first guide vane. The conveyor assembly is located in the one or more housings and in the crop passage, and is movable to propel a flow of crop material along a feeder flow direction from a first conveyor end to a second conveyor end, the crop material being distributed along a width of the conveyor assembly in a transverse direction, the transverse direction being perpendicular to the feeder flow direction. The first rotor is located in the one or more housings and mounted to rotate about a first rotor axis. The first rotor extends along the first rotor axis from a proximal first rotor end that is relatively close to the conveyor assembly to a distal first rotor end that is relatively far from the conveyor assembly. The first rotor has one or more respective inlet vanes located at the proximal first rotor end, the one or more inlet vanes being positioned to receive a first portion of the flow of crop material from the feeder assembly in a first receiving region located below the first rotor axis, each of the one or more inlet vanes having a respective leading edge that, upon rotation of the first rotor about the first rotor axis, travels towards the first receiving region on a first transverse side of the first rotor axis and away from the receiving region on a second transverse side of the first rotor axis. The first guide plate is located within or defines a portion of the one or more housings, and is positioned adjacent the first receiving region and extends in the transverse direction along at least a portion of the width of the conveyor assembly. The at least one first guide vane extends from the first guide plate into the crop passage on the first transverse side of the first rotor axis, and each first guide vane extends from a leading edge that is relatively far from the first receiving region to a trailing edge that is relatively close to the first receiving region, and is oriented at a respective angle relative to the feeder flow direction with the trailing edge closer to the first rotor axis, in the transverse direction, than the leading edge.

In some exemplary aspects, the at least one first guide vane may include a plurality of first guide vanes. The plurality of first guide vanes first guide vanes each may be oriented at a respective angle relative to the feeder flow direction, with the respective angle of a first guide vane that is most distant from the first rotor axis being greater than the respective angle of a first guide vane that is closest to the first rotor axis.

In some exemplary aspects, at least one second guide vane may extend from the first guide plate into the crop passage on the second transverse side of the first rotor axis, each second guide vane extending from a leading edge that is relatively far from the first receiving region to a trailing edge that is relatively close to the first receiving region, and being oriented at a respective angle relative to the feeder flow direction with the leading edge closer to the first rotor axis, in the transverse direction, than the trailing edge.

In some exemplary aspects, at least one third guide vane may extend from the first guide plate into the crop passage on the second transverse side of the first rotor axis, each third guide vane extending from a leading edge that is relatively far from the first receiving region to a trailing edge that is relatively close to the first receiving region, with the leading edge and trailing being equidistant to the first rotor axis in the transverse direction.

In some exemplary aspects, the at least one first guide vane or vanes may be movable relative to the guide plate, between a first position in which the at least one first guide vane extends a first distance into the crop passage, and second position in which the at least one first guide vane extends a second distance into the crop passage or is removed from the crop passage.

In some exemplary aspects, the at least one first guide vane may be movably mounted relative to the first guide plate to change the respective angle relative to the feeder flow direction between a first angle in which the leading edge and the trailing edge are offset from each other relative to the transverse direction by a first distance, and a second angle in which the leading edge and the trailing edge are offset from each other relative to the transverse direction by a second distance, the second distance being greater than the first distance.

In some exemplary aspects, at least a portion of the first guide plate may be located below the conveyor assembly.

In some exemplary aspects, at least a portion of the first guide plate may be located below a rotary beater located between the conveyor assembly and the first rotor.

In some exemplary aspects, the crop feeder system also may include a second rotor, second guide plate, and fourth guide vane. The second rotor is located in the one or more housings adjacent to the first rotor along the transverse direction, the second rotor being mounted to rotate about a second rotor axis. The second rotor extends along the second rotor axis from a proximal second rotor end that is relatively close to the conveyor assembly to a distal second rotor end that is relatively far from the conveyor assembly. The second rotor has one or more respective inlet vanes located at the proximal second rotor end, the one or more inlet vanes being positioned to receive a second portion of the flow of crop material from the feeder assembly in a second receiving region located below the second rotor axis, each of the one or more inlet vanes having a respective leading edge that, upon rotation of the second rotor about the second rotor axis, travels towards the second receiving region on a first transverse side of the second rotor axis and away from the receiving region on a second transverse side of the second rotor axis. The second guide plate is located within or defines a portion of the one or more housings, and is positioned adjacent the second receiving region and extends in the transverse direction along at least a portion of the width of the conveyor assembly. The at least one fourth guide vane extends from the second guide plate into the crop passage on the first transverse side of the second rotor axis, and each fourth guide vane extends from a leading edge that is relatively far from the second receiving region to a trailing edge that is relatively close to the second receiving region, and is oriented at a respective angle relative to the feeder flow direction with the trailing edge closer to the second rotor axis, in the transverse direction, than the leading edge. The first rotor may rotate in a first direction around the first rotor axis, and the second rotor may rotate in an opposite direction around the second rotor axis.

Exemplary aspects also may be incorporated into an agricultural combine having a chassis configured for movement across a surface, and a header attached to the chassis and configured to receive a flow of crop material and direct the crop material into the crop passage.

BRIEF DESCRIPTION OF THE DRAWINGS

Embodiments of inventions will now be described, strictly by way of example, with reference to the accompanying drawings, in which:

FIG. 3 is a cutaway top plan view of a crop feeder system having angled guide vanes according to one aspect of the invention.

FIG. 4 is a cutaway side view of the embodiment of FIG. 3.

FIG. 5 is a schematic front view of the rotor of FIGS. 3 and 4, as viewed along the rotor's rotation axis.

DETAILED DESCRIPTION OF THE DRAWINGS

Figure 1:
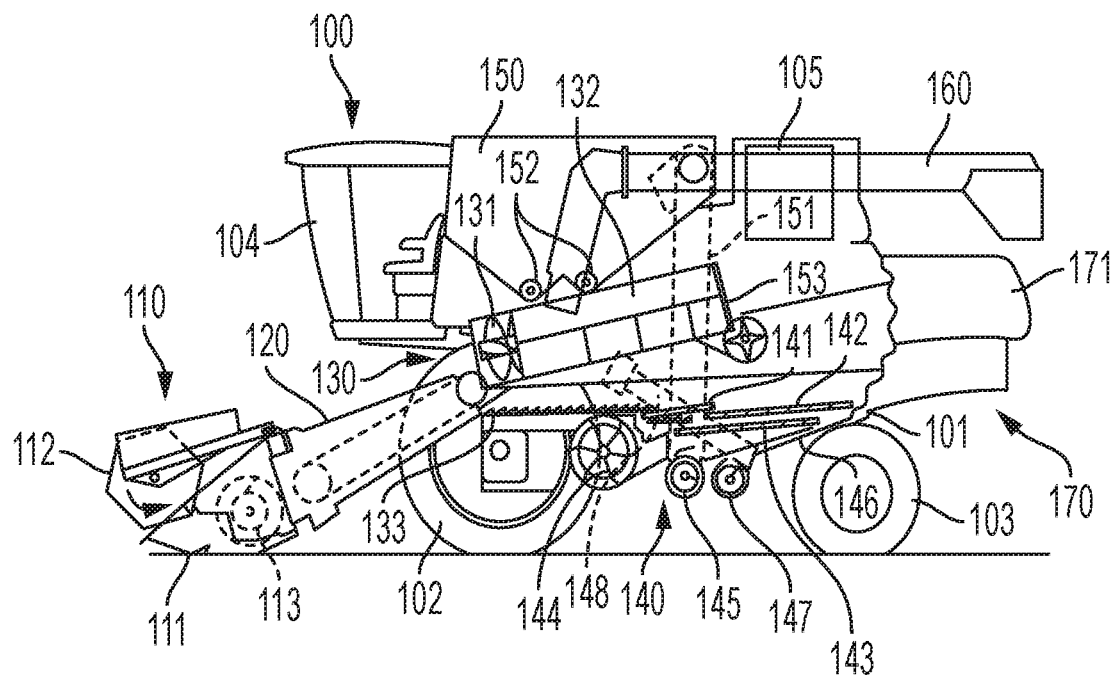
FIG. 1 is a schematic side elevation view of an exemplary agricultural combine suitable for use with the present invention.

The drawing figures depict one or more implementations in accordance with the present concepts, by way of example only, not by way of limitations. In the figures, like reference numerals refer to the same or similar elements. The terms "forward," "rearward," "left" and "right," when used herein in connection with the agricultural combine and/or components thereof are usually determined with reference to the direction of forward operative travel of the harvester. Similarly, the term "longitudinal" refers to the fore-aft direction, and "transverse" refers to the left-right direction (i.e., perpendicular to the fore-aft direction). Such terms are used for convenience in explaining the embodiments described herein, but should not be construed as limiting.

The embodiments described herein are directed to a crop feeding system configured to provide improved crop distribution into an axial-flow combine having one or more rotors. It will be understood that embodiments may be used in other contexts and with other equipment, and the scope of the invention is limited only be the requirements of the appended claims.

FIG. 1 illustrates an example of an agricultural machine in the form of a combine 100, in which embodiments of the invention may be incorporated. The combine 100 includes a chassis 101, ground engaging wheels 102 and 103, a header 110, a feeder assembly 120, an operator cab 104, a threshing and separating system 130, a cleaning system 140, a grain tank 150, and an unloading auger 160. The front wheels 102 typically are the drive wheels, and may comprise, for example, two, four, or more larger flotation type wheels. The rear wheels 103 typically are smaller than the front wheels 102, and are steerable. Motive force is selectively applied to the front wheels 102 by a power plant, such as a diesel engine 105, and a transmission (not shown). The front or rear wheels 102, 103 in some cases may be replaced by tracked wheel assemblies.

The header 110 is mounted to the front of the combine 100, and includes a cutter bar 111 for severing crops from a field during forward motion of the combine 100. A rotatable reel 112 feeds the crop into the header 110, and augers 113 or draper belts feed the severed crop laterally inwardly from each side toward the feeder assembly 120. The feeder assembly 120 conveys the cut crop to the threshing and separating system 130, and is selectively vertically movable using appropriate actuators, such as hydraulic cylinders (not shown).

The threshing and separating system 130 is of the axial-flow type, and includes a threshing rotor 131 that is at least partially enclosed by a rotor cage 200 (FIG. 2), and rotatable within a corresponding perforated concave 132. The cut crop material is threshed and separated by the rotation of the rotor 131 within the concave 132, and larger elements, such as stalks, leaves and the like are discharged from the rear of the combine 100. Smaller elements of crop material including grain and non-grain crop material, including particles lighter than grain, such as chaff, dust and straw, are discharged through perforations of the concave 132.

Grain separated from the remaining crop material by the threshing and separating assembly 130 falls onto a grain pan 133 and is conveyed toward the cleaning system 140. The cleaning system 140 may include devices such as a pre-cleaning sieve 141, an upper sieve 142 (also known as a chaffer sieve or sieve assembly), a lower sieve 143 (also known as a cleaning sieve), and a cleaning fan 144. Grain and other crop material on the sieves 141, 142 and 143 is subjected to a cleaning action by the fan 144 which provides an air flow through the sieves to remove chaff and other impurities such as dust from the grain by making this material airborne. The separated material is discharged through a straw hood 171 of a residue handling system 170 of the combine 100. The grain pan 133 and the pre-cleaning sieve 141 may oscillate in a fore-to-aft manner to transport the grain and finer non-grain crop material to the upper surface of the upper sieve 142. The upper sieve 142 and the lower sieve 143 are vertically arranged relative to each other, and likewise may oscillate in a fore-to-aft manner to spread the grain across the sieves 142, 143, while permitting the passage of cleaned grain by gravity through openings through the sieves 142, 143.

Clean grain falls to a clean grain auger 145 positioned crosswise below and toward the front of the lower sieve 143. The clean grain auger 145 receives clean grain from each sieve 142, 143 and from a bottom pan 146 of the cleaning system 140. The clean grain auger 145 conveys the clean grain laterally to a generally vertically arranged grain elevator 151 for transport to grain tank 150. Tailings from the cleaning system 140 fall to a tailings auger trough 147. The tailings are transported via a tailings auger 147 and a return auger 148 to the upstream end of the cleaning system 140 for repeated cleaning action. A pair of grain tank augers 152 at the bottom of the grain tank 150 convey the clean grain laterally within the grain tank 150 to the unloading auger 160 for discharge from the combine 100.

Figure 2:
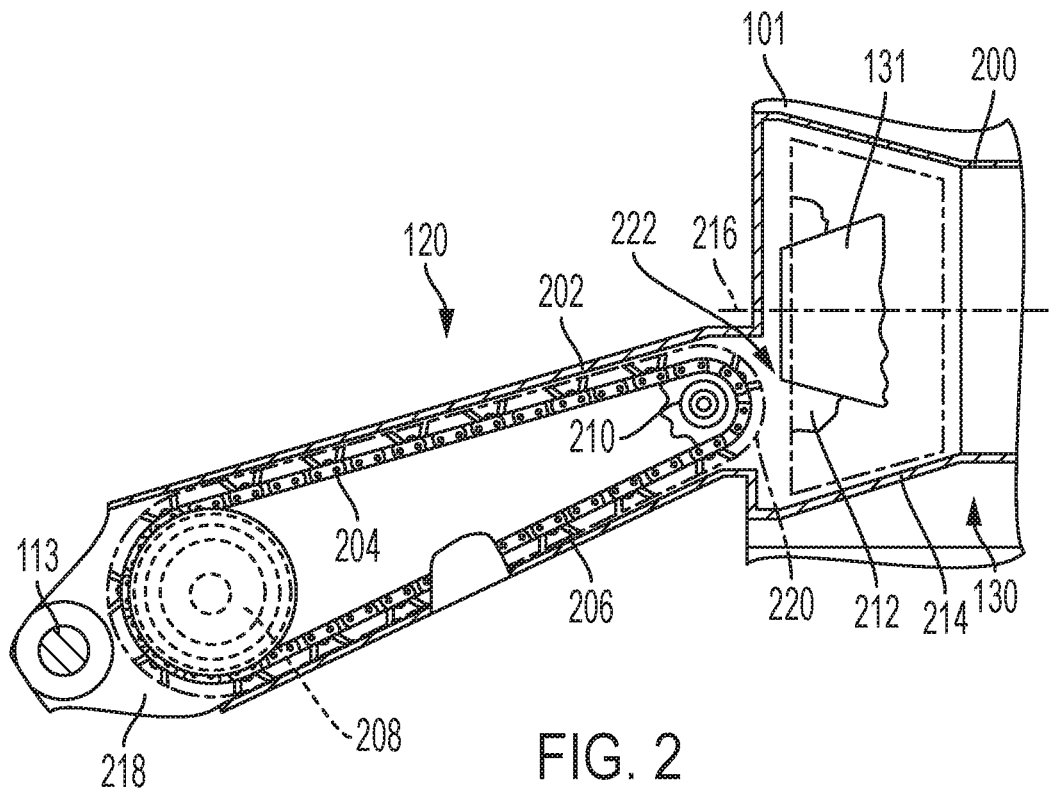
FIG. 2 is a cutaway side elevation view of the feeder system of the combine of FIG. 1.

FIG. 2 illustrates an exemplary feeder assembly 120 and associated parts in more detail. The feeder assembly 120 includes a housing 202 that forms a passage extending from a front opening facing the header 110 (e.g., at the central portion of a double auger 113), to a rear opening facing the threshing and separating system 130. The rear end of the feeder housing 202 may be rigidly joined to the vehicle chassis 101, or joined by a pivot or other movable joint, as known in the art.

Inside the feeder housing 202 is a conveyor assembly formed by multiple laterally displaced endless chains 204 (only one of which is visible in this side view). A plurality of slats 206 extend transversely from one chain 204 to the next. The chains 204 wrap around a front chain support 208 located adjacent the header 110, and a rear chain support 210 located adjacent the threshing and separating system 130. One or more drive sprockets are provided (e.g., at the rear chain support 210) to apply a motive force to move the chains 204 and slats 206. The conveyor assembly can also use belts, rather than chains, and any arrangement of slats or the like to move the crop materials.

Movement of the conveyor assembly carries crop material below the conveyor assembly and back towards the threshing and separating system 130, and ejects the crop material into the spinning rotor 131. The rotor 131 includes inlet vanes 212 that receive the crop material and guide it back to pass along the remainder of the rotor 131 to performing the threshing operation. The inlet vanes 212 may be disposed within a conical receiving chamber 214 that matches a corresponding outward longitudinal profile of the vanes 212.

It will be appreciated that the conveyor assembly and rotor 131 are enclosed—partially or completely—within one or more housings to form a crop passage 222. The crop passage 222 restricts movement of the crop material to prevent it from bypassing the rotor 131. The crop passage 222 may be formed by any suitable arrangement of housing parts, such as the feeder assembly housing 202, the rotor receiving chamber 214, and other panels, covers or other structures.

As noted above, in a typical prior art construction, the feeder assembly 120 is centered on the rotor 131 and the conical receiving chamber 214 to present the full volume of crop material across the width of the rotor 131. The slats 206 deliver the crop material in a parallel flow along the width of the feeder assembly 120. Thus, the crop material is propelled into the rotor 131 in a uniform "face feeding" pattern across the width of the inlet vanes 212.

The inventors have determined that such face feeding can be detrimental to the efficient operation of the threshing and separating system 130, and thus the combine 100 as a whole. In particular, the rotor 131 and its inlet vanes 212 continuously rotate about a longitudinal rotor axis 216 that is generally aligned with the direction in which the crop is propelled along the feeder assembly 120. Thus, one transverse side of the rotor 131 is moving down relative to the feeder assembly 120, and the other transverse side of the rotor 131 is moving up relative to the feeder assembly 120.

The crop material entering the downward-moving side of the rotor 131 is moving against the rotor's direction, and this material must be redirected significantly before continuing along the rotor 131. In contrast, the material entering on the upward-moving side of the rotor 131 can flow more naturally into the rotor 131 without as significant a change in direction. It is expected that this leads to less efficient operation of the rotor and the combine in general.

The inventors have addressed the foregoing problem by incorporating guide vanes into the crop passage to redirect at least a portion of the crop material towards the rotating direction of the rotor. A first exemplary embodiment of this implementation is illustrated in FIGS. 3 and 4, which show top and side views of portions of a combine crop feeding system including a rotor 131 and a feeder assembly 120. In FIG. 3, the feeder assembly 120 is shown withdrawn somewhat from the rotor 131 to provide an unobstructed view of the underlying parts.

The feeder assembly 120 includes a conveyor assembly formed by chains 204 and slats 206. As also shown in FIG. 2, the chains 204 and slats are supported between a front chain support 208 and a rear chain support 210. The supports 208, 210 and or separate drive mechanisms (e.g., sprockets) are rotated by a motor (not shown) to drive the chains around the supports 208, 210. As the chains 204 move, the attached slats 206 propel a flow of crop material along a feeder flow direction F from a first end 218 of the conveyor assembly at the front chain support 208, to a second end 220 of the conveyor assembly at the rear chain support 210. The parts may be configured to move the crop above or below the chains 204. In the example of FIG. 2, the supports 208, 210 rotate counterclockwise as seen in this view, so the crop moves below the chains 204. The crop material is distributed along a width W of the conveyor assembly, the width W extending in a transverse direction T that is perpendicular to the feeder flow direction F.

Chain and slat conveyors such as the one illustrated are known in the art and need not be described in more detail herein. It will also be understood that chains and slat conveyor assembly may be replaced by any other suitable mechanism for driving the crop material along the feeder flow direction F.

The rotor 131 is located downstream of the conveyor assembly along the crop passage, and is mounted to rotate about the rotor axis 216. The rotor 131 extends along the rotor axis 216 from a proximal rotor end 300 that is relatively close to the conveyor assembly, to a distal rotor end 153 (FIG. 1) that is relatively far from the conveyor assembly. Thus, the rotor 131 extends away from the conveyor assembly along the rotor axis 216. The rotor 131 has one or more inlet vanes 212 at the proximal rotor end 300. The inlet vanes 212 have a helical shape or any other suitable ramp-like shape to drive the crop material backwards towards the distal rotor end 153. Each inlet vane 212 has a respective leading edge 302 defining the foremost point of the inlet vane 212 that typically is the first part to strike the incoming crop material.

As shown in FIG. 4, the inlet vanes 212 are positioned to receive the crop material from the feeder assembly 120 in a receiving region 400 located below the rotor axis. As viewed from above in FIG. 3, the receiving region 400 extends across all or a portion of the width W of the conveyor assembly, with a portion of the receiving region 400 being on a first transverse side 304 of the rotor axis 216, and a second portion of the receiving region 400 being on a second transverse side 306 of the rotor axis 216. Thus, as shown in FIG. 5, when the rotor 131 rotates about the rotor axis 216, the leading edges 302 of the inlet vanes 212 will travel towards the receiving region 400 on the first transverse side 304 of the rotor axis 216, and will travel away from the receiving region 400 on the second transverse side 306 of the rotor axis 216.

A guide plate 308 is located adjacent to the receiving region 400. The guide plate 308 may define part of a surrounding housing that forms the crop passage (e.g., part of the feeder housing 202 or a downstream housing member), or provided as a separate structure within the housings that form the crop passage. The guide plate 308 extends in the transverse direction T along at least a portion of the conveyor assembly, and is located in the crop passage to direct crop material exiting the conveyor assembly towards the inlet vanes 212. In the example of FIGS. 3 and 4, a front portion of the guide plate 308 is located immediately below the second end 220 of the conveyor assembly, as shown in FIG. 4 (FIG. 3 illustrates the feeder assembly 120 displaced, for purposes of illustration, in the forward direction (down in this view) to show underlying parts). The guide plate 308 may be angled to direct crop material upwards towards the inlet vanes 212, and it may have a concave shape as viewed along the transverse direction T, such as shown in FIG. 4.

One or more guide vanes 310 are positioned to extend from the guide plate 308 and into the crop passage 222. The guide vanes 310 are thus placed within the path of the moving crop material, and operate to influence the movement path of the crop material. The guide vanes 310 are oriented generally along the direction from the conveyor assembly to the rotor 131, with each guide vane 310 extending from a leading edge 402 that is relatively far from the receiving region 400 to a trailing edge 404 that is relatively close to the receiving region 400. Each guide vanes 310 is oriented at a respective angle A relative to the feeder flow direction F, although, as explained below the angle A of some guide vanes 310 may be zero (i.e., parallel with the flow direction F).

In a preferred embodiment, at least one of the guide vanes 310 is located on the first transverse side 304 of the rotor axis 216, where the leading edges 302 of the inlet vanes 212 sweep down towards the receiving region 400. Furthermore, this guide vane is oriented at a non-zero angle A relative to the flow direction F, such that the trailing edge 404 of the guide vane 310 is closer in the transverse direction T to the rotor axis than the leading edge 402. This orientation, i.e., the trailing edge 404 being offset relative to the leading edge 402 in a direction corresponding to the direction from the first transverse side 304 towards the second transverse side 306, is referred to herein as having a "positive" angle.

A guide vane 310 having a positive angle is expected to deflect at least some of the incoming crop material towards the second transverse side 306 of the rotor 131, as shown by the arrows in FIG. 3. This redirection of crop material before entering the rotor 131 reduces the angle of incidence of the crop material relative to the downward-sweeping leading edges 302 of the inlet vanes 212, and therefore the inlet vanes 212 are expected to require less energy to draw in the crop material. This is expected to encourage more efficient movement of the crop material in the transition from the conveyor assembly to the rotor 131, and make the overall process more efficient.

While a single guide vane 310 on the first transverse side 304 may be sufficient to improve efficiency, it is expected that multiple such guide vanes 310 will improve the efficiency even more. To this end, as shown in FIG. 3, there may be a plurality of guide vanes 310 located on the first transverse side 304, with one or more (and preferably all) of these guide vanes having a positive angle. The particular values of the angles may be selected or tuned according to the particular physical characteristics of the conveyor assembly and rotor 131, to crop conditions, and so on. For example, in FIG. 3, the leftmost guide vane has a positive angle of 20°, and the angles of the remaining guide vanes 310 gradually decrease towards the rotor axis 216. Thus, the guide vane 310 is most distant from the rotor axis 216 has an angle A that is greater than the angle of the guide vane 310 that is closest to the rotor axis 216. This graduated arrangement of angles A may be helpful to prevent crop material located at or near the rotor axis 216 from becoming excessively dense on the second transverse side 306 of the rotor axis 216.

One or more guide vanes 310 also may be positioned on the second transverse side 306 of the rotor axis 216. Some or all of the guide vanes 310 on this side may also have a positive angle A. For example, in the second transverse side 306, the guide vanes 310 that are closest to the rotor axis 216 may be oriented with a positive angle A (in this case, the positive angle A results in the leading edge 402 of each guide vane 310 being closer to the rotor axis 216 than the trailing edge 404.) Some or all of the guide vanes 310 on the second transverse side 306 also may have a zero angle instead of a positive angle, in which the leading edge 402 and trailing edge 404 are equidistant from the rotor axis 216 in the transverse direction. For example, the guide vanes 310 most distant from the rotor axis 216 on the second transverse side 306 may be oriented with a zero angle A, as shown in FIG. 3.

Other alternatives and variations of guide vane positions and orientations will be apparent to persons of ordinary skill in the art in view of the present disclosure. For example, some guide vanes 310 in the first transverse side 304 may have a zero angle A, or some guide vanes 310 in the second transverse side 306 may have a negative angle A (i.e. oriented opposite to a positive angle A). Also, one or more guide vanes 310 also may be positioned to cross over the rotor axis 216.

One or more of the guide vanes 310 also may be movably mounted. For example, as shown in FIG. 6, the guide vanes 310 may be movable in and out of the crop passage 222, or, as shown in FIG. 7, the guide vanes 310 may be movable to change their angle A.

Figure 6:
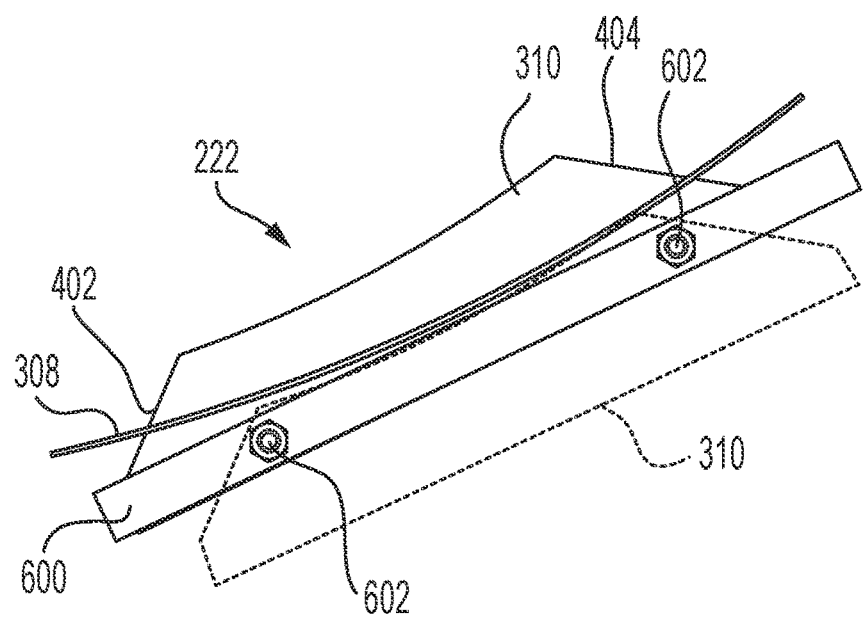
FIG. 6 illustrates an example of a retractable guide vane.

FIG. 6 schematically illustrates a retractable guide vane 310. The guide vane 310 is clamped place between two bars 600 by one or more fasteners 602, such as bolts or the like. The bars 600 are mounted to the back of (or behind) the guide plate 308. In the position shown in solid lines, the guide vane 310 is extended into the crop passage 222. In the position shown in broken lines, the guide vane 310 is fully retracted or nearly fully retracted behind the guide plate 308. Thus, the guide vane 310 is movable between a first position (solid lines) in which the guide vane 310 extends a first distance into the crop passage 222, and second position (broken lines) in which the guide vane extends a second distance into the crop passage or is removed from the crop passage 222.

The example of FIG. 6 uses a simple clamp mechanism to hold the guide vane 310 at different positions, but it will be appreciated that other mechanisms may be used. For example, the guide vane 310 may be pivotally mounted at one end to the bottom of the guide plate 308, with the free end being movable to reposition the guide vane 310. As another example, the guide vane 310 may be mounted on a platform that slides linearly to move the guide vane 310 to the different positions within the crop passage 222. Any suitable motor and mechanism or linkage may be used to provide the desired motion, such as electric, hydraulic or pneumatic motors, or motion may be accomplished manually. Where automated motion is used, the control of such motion may be programmed to automatically to account for changing crop conditions.

Figure 7:
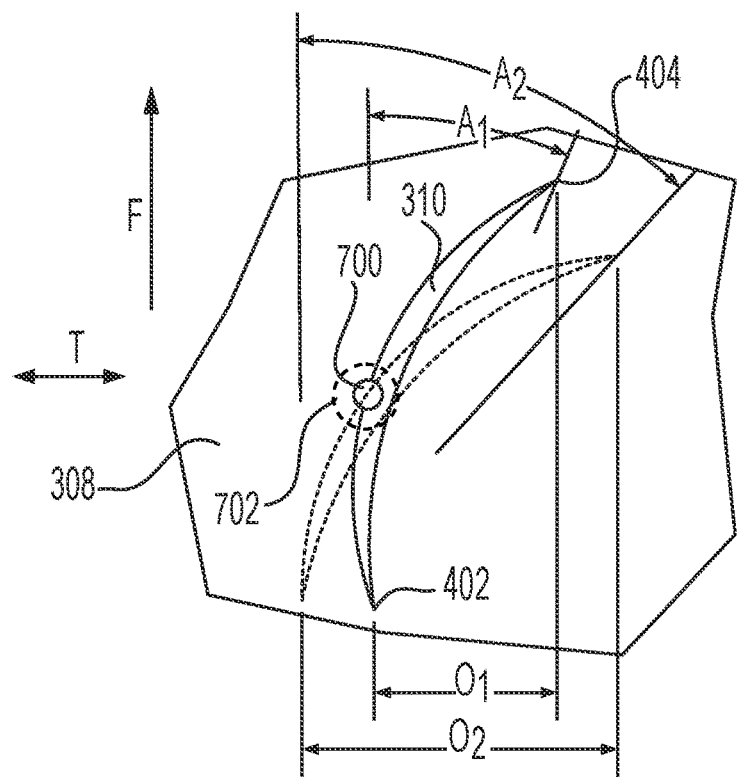
FIG. 7 illustrates an example of a rotatable guide vane.

In FIG. 7, the guide vane 310 is movable to different angles A relative to the feeder flow direction F. In a first position, shown in solid lines, the guide vane 310 is oriented at a first angle $A_1$, and in a second position, shown in broken lines, the guide vane 310 is at a second angle $A_2$, which is greater than the first angle $A_1$. Such motion changes the offset in the transverse direction T between the leading edge 402 and the trailing edge 404—specifically, the offset $O_1$ in the first position is less than the offset $O_2$ in the second position.

The guide vane 310 may be movable to different angles A using any suitable mechanism. In the shown example, the guide vane 310 is mounted on a pivot pin 700 that extends through the guide plate 308 to engage a motor 702 (shown schematically) or other mechanism that is operated to rotate the pivot pin 700 and thus the guide vane 310. The pivot 700 may be located anywhere along the length of the guide vane 310, or it may be displaced from the guide vane. The pivot 700 also may be replaced by mechanisms such as a linkage that generates an angular motion. Other alternatives and variations will be apparent to persons of ordinary skill in the art in view of the present disclosure.

FIG. 7 also illustrates an example in which the guide vane 310 has a curved shape, rather than the linear shape shown in FIG. 3. Other shapes may be used as desired. For example, the guide plate may comprise a triangular shape or the like.

Figure 8:
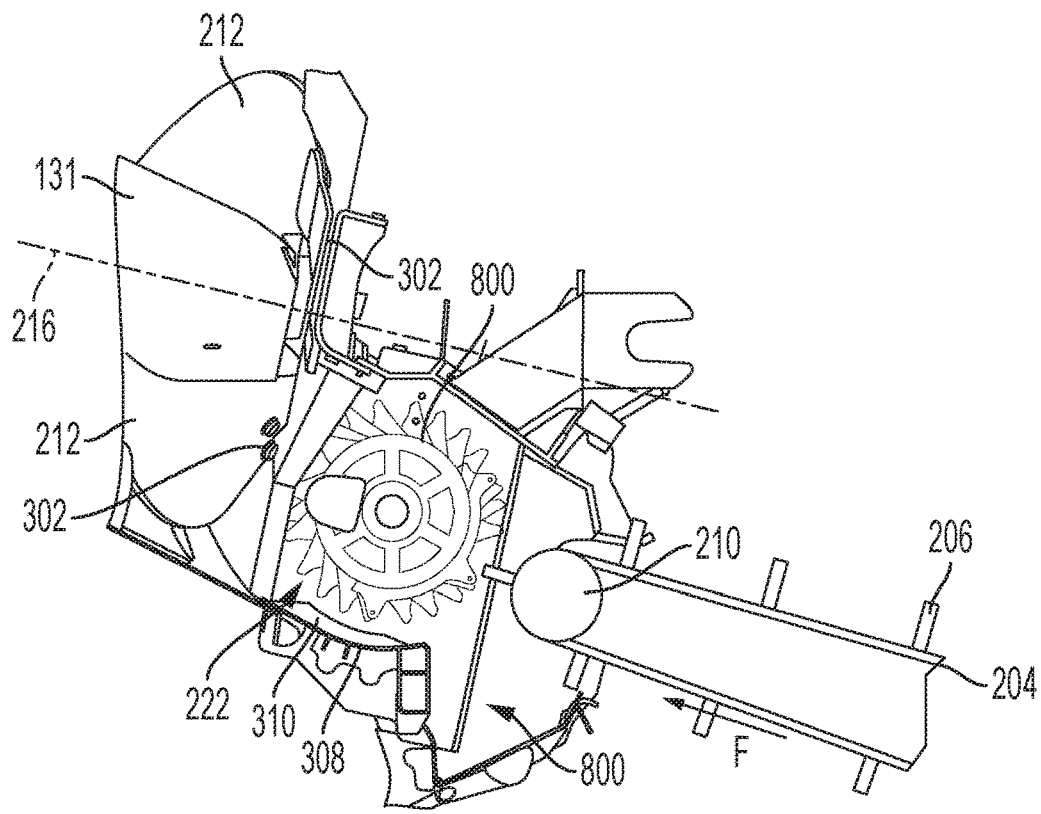
FIG. 8 is a cutaway side view of another embodiment including a crop beater.

Referring now to FIG. 8, an alternative embodiment of a crop feeder system is illustrated in which a rotary beater 800 is located between the conveyor assembly (not shown) and the rotor 131. The crop beater 800 comprises a rotatable structure having a number of paddles extending from it. The crop beater 800 is rotated clockwise in the view of FIG. 8, and action of the paddles against the crop material helps to remove heavy objects such as rocks from the crop material, and also might help chop and redistribute the crop material before entering the rotor 131. Rocks are ejected to a bin 802 located below the conveyor assembly, and the bin 802 is periodically opened to remove the rocks and any other accumulated material.

As with the previous embodiment, the guide vanes 310 are located on a guide plate 308, and extend into the crop passage 222. In this case, however, the guide vanes 310 are located below the rotary beater 800. Alternatively, the guide vanes 310 and guide plate 308 may be located elsewhere, such as below the end of the conveyor assembly. The guide plate 308 and/or guide vanes 310 also may be elongated to extend below both the crop beater 800 and the conveyor assembly, or multiple discrete sets of guide plates 308 and guide vanes 310 may be located along the crop passage 222 in the region between the feeder assembly 120 and the rotor 131.

Figure 9:
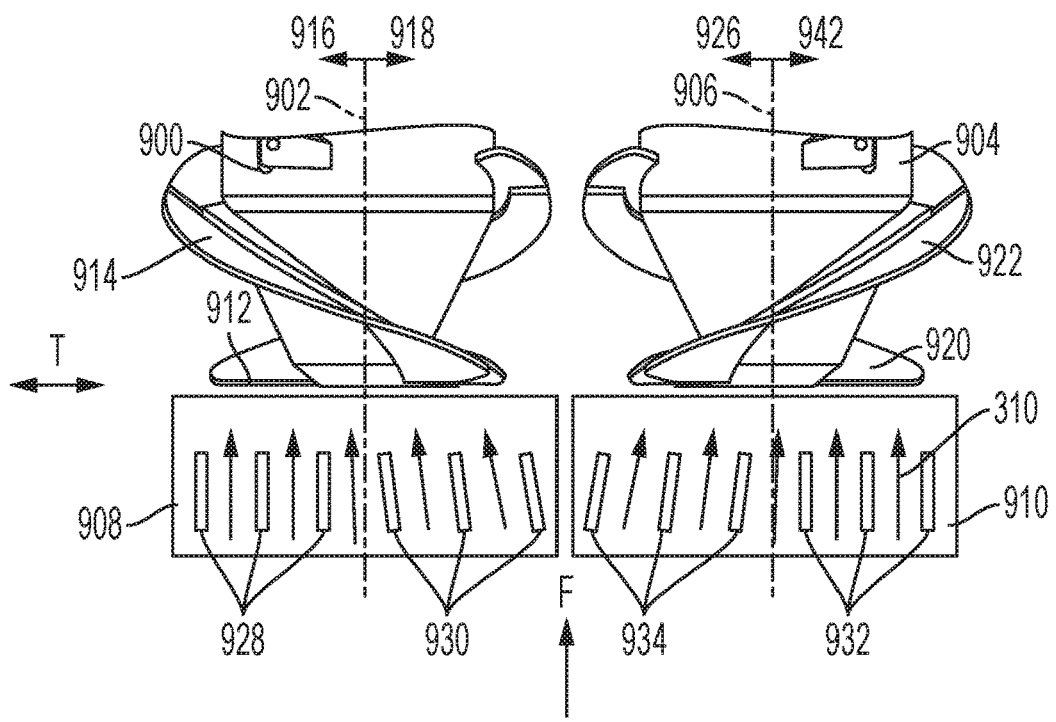
FIG. 9 is a top plan view of another embodiment having two axial flow rotors.

FIG. 9 illustrates another example of a crop feeder system. FIG. 9 is a top view similar to that of FIG. 3, but the conveyor assembly is removed for clarity. In this case, the single rotor 131 is replaced by a left rotor 900 that rotates about a left rotor axis 902, and a right rotor 904 that rotates about a right rotor axis 906. Each rotor 900, 904 has a respective guide plate 908, 910 located in front of it. The two guide plates 908, 910 may be separate, or formed as a single unitary plate. One or more conveyor assemblies, such as those discussed above, are positioned to feed crop material into the two rotors 900, 904 along a feeder flow direction F. As before, guide vanes 310 are provided to extend from the guide plates 308 into the crop passage 222, and the crop enters the rotors 900, 904 at a location below the rotor axes 902, 904. In this case, however, the guide vanes 310 are arranged to direct the crop flow to account for rotation of the two different rotors.

In the shown example, the left rotor 900 and right rotor 904 rotate in opposite directions. The left rotor 904 rotates such that the leading edges 912 of its inlet vanes 914 move away from the crop receiving region on the left side 916 of the left rotor axis 902, and towards the crop receiving region on the right side 918 of the left rotor axis 902. The right rotor 904 rotates such that the leading edges 920 of its inlet vanes 922 move away from the crop receiving region on the right side 924 of the right rotor axis 906, and towards the crop receiving region on the left side 926 of the right rotor axis 906.

The inlet vanes 928 on the left side 916 of the left rotor axis 902 are oriented at a zero angle, whereas the inlet vanes 930 on the right side 918 of the left rotor axis 902 are oriented at a positive angle with the leading edges being farther from the left rotation axis 902 in the transverse direction T than the respective trailing edges. Similarly, inlet vanes 932 located on the right side 924 of the right rotor axis 906 are oriented at a zero angle, whereas the inlet vanes 934 located on the left side 926 of the right rotor axis 906 are oriented at a positive angle with the leading edges being farther from the right rotation axis 906 in the transverse direction T than the respective trailing edges. Note that the "positive" angled guide vanes 930 leading to the left rotor 900 are turned to the left, and the "positive" angled guide vanes 934 leading to the right rotor 904 are turned to the right, because the term "positive" is defined as being angled towards the side of the rotor 900 at which the leading edges 912 move away from the crop receiving region.

This embodiment is expected to provide similar benefits to those described in relation to FIG. 3. In this case, a portion of the crop material will proceed to each set of guide vanes, and be directed to a respective one of the rotors 900, 904. The turning action provided by the angled guide vanes 930, 934 is expected to help the crop material enter the respective rotor 900, 904 more efficiently. The angled guide vanes 930, 934 also may help prevent crop material from idling in the region between the two rotors 900,904.

It will also be appreciated that the arrangement and angles of the guide vanes in this embodiment may be modified in various ways, such as by omitting the guide vanes that are at a zero angle, adding guide having different angles in different regions, and so on. Also if the rotation directions of the rotors 900, 904 are changed, the angles of the inlet vanes may be changed accordingly. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A crop feeder system for an agricultural vehicle, the crop feeder system comprising:
one or more housings defining a crop passage;
a conveyor assembly located in the one or more housings and in the crop passage, the conveyor assembly being movable to propel a flow of crop material along a feeder flow direction from a first conveyor end to a second conveyor end, the crop material being distributed along a width of the conveyor assembly in a transverse direction, the transverse direction being perpendicular to the feeder flow direction;
a first rotor located in the one or more housings and mounted to rotate about a first rotor axis, the first rotor extending along the first rotor axis from a proximal first rotor end that is relatively close to the conveyor assembly to a distal first rotor end that is relatively far from the conveyor assembly, the first rotor having one or more respective inlet vanes located at the proximal first rotor end, the one or more inlet vanes being positioned to receive a first portion of the flow of crop material from the conveyor assembly in a first receiving region located below the first rotor axis, each of the one or more inlet vanes having a respective leading edge that, upon rotation of the first rotor about the first rotor axis, travels towards the first receiving region on a first transverse side of the first rotor axis and away from the receiving region on a second transverse side of the first rotor axis;
a first guide plate located within or defining a portion of the one or more housings, the first guide plate being positioned adjacent the first receiving region and extending in the transverse direction along at least a portion of the width of the conveyor assembly; and
at least one first guide vane extending from the first guide plate into the crop passage on the first transverse side of the first rotor axis, each first guide vane extending from a leading edge that is relatively far from the first receiving region to a trailing edge that is relatively close to the first receiving region, and being oriented at a respective angle relative to the feeder flow direction with the trailing edge closer to the first rotor axis, in the transverse direction, than the leading edge.

2. The crop feeder system of claim 1, wherein the at least one first guide vane comprises a plurality of first guide vanes.

3. The crop feeder system of claim 2, wherein the plurality of first guide vanes are each oriented at a respective angle relative to the feeder flow direction, with the respective angle of a first guide vane that is most distant from the first rotor axis being greater than the respective angle of a first guide vane that is closest to the first rotor axis.

4. The crop feeder system of claim 1, further comprising at least one second guide vane extending from the first guide plate into the crop passage on the second transverse side of the first rotor axis, each second guide vane extending from a leading edge that is relatively far from the first receiving region to a trailing edge that is relatively close to the first receiving region, and being oriented at a respective angle relative to the feeder flow direction with the leading edge closer to the first rotor axis, in the transverse direction, than the trailing edge.

5. The crop feeder system of claim 1, further comprising at least one third guide vane extending from the first guide plate into the crop passage on the second transverse side of the first rotor axis, each third guide vane extending from a leading edge that is relatively far from the first receiving region to a trailing edge that is relatively close to the first receiving region, with the leading edge and trailing being equidistant to the first rotor axis in the transverse direction.

6. The crop feeder system of claim 1, wherein the at least one first guide vane is movably mounted relative to the first guide plate, and movable between a first position in which the at least one first guide vane extends a first distance into the crop passage, and second position in which the at least one first guide vane extends a second distance into the crop passage or is removed from the crop passage.

7. The crop feeder system of claim 1, wherein the at least one first guide vane is movably mounted relative to the first guide plate to change the respective angle relative to the feeder flow direction between a first angle in which the leading edge and the trailing edge are offset from each other relative to the transverse direction by a first distance, and a second angle in which the leading edge and the trailing edge are offset from each other relative to the transverse direction by a second distance, the second distance being greater than the first distance.

8. The crop feeder system of claim 1, wherein at least a portion of the first guide plate is located below the conveyor assembly.

9. The crop feeder system of claim 1, wherein at least a portion of the first guide plate is located below a rotary beater located between the conveyor assembly and the first rotor.

10. The crop feeder system of claim 1, further comprising a second rotor located in the one or more housings adjacent to the first rotor along the transverse direction, the second rotor being mounted to rotate about a second rotor axis, the second rotor extending along the second rotor axis from a proximal second rotor end that is relatively close to the conveyor assembly to a distal second rotor end that is relatively far from the conveyor assembly, the second rotor having one or more respective inlet vanes located at the proximal second rotor end, the one or more inlet vanes being positioned to receive a second portion of the flow of crop material from the conveyor assembly in a second receiving region located below the second rotor axis, each of the one or more inlet vanes having a respective leading edge that, upon rotation of the second rotor about the second rotor axis, travels towards the second receiving region on a first transverse side of the second rotor axis and away from the receiving region on a second transverse side of the second rotor axis;
a second guide plate located within or defining a portion of the one or more housings, the second guide plate being positioned adjacent the second receiving region and extending in the transverse direction along at least a portion of the width of the conveyor assembly; and
at least one fourth guide vane extending from the second guide plate into the crop passage on the first transverse side of the second rotor axis, each fourth guide vane extending from a leading edge that is relatively far from the second receiving region to a trailing edge that is relatively close to the second receiving region, and being oriented at a respective angle relative to the feeder flow direction with the trailing edge closer to the second rotor axis, in the transverse direction, than the leading edge.

11. The crop feeder system of claim 10, wherein the first rotor rotates in a first direction around the first rotor axis, and the second rotor rotates in an opposite direction around the second rotor axis.

12. An agricultural combine comprising:
a chassis configured for movement across a surface;
a conveyor assembly located in the one or more housings and on the crop passage, the conveyor assembly being movable to propel a flow of crop material along a feeder flow direction from a first conveyor end to a second conveyor end, the crop material being distributed along a width of the conveyor assembly in a transverse direction, the transverse direction being perpendicular to the feeder flow direction;
a first rotor located in the one or more housings and mounted to rotate about a first rotor axis, the first rotor extending along the first rotor axis from a proximal first rotor end that is relatively close to the conveyor assembly to a distal first rotor end that is relatively far from the conveyor assembly, the first rotor having one or more respective inlet vanes located at the proximal first rotor end, the one or more inlet vanes being positioned to receive a first portion of the flow of crop material from the conveyor assembly in a first receiving region located below the first rotor axis, each of the one or more inlet vanes having a respective leading edge that, upon rotation of the first rotor about the first rotor axis, travels towards the first receiving region on a first transverse side of the first rotor axis and away from the receiving region on a second transverse side of the first rotor axis;
a first guide plate located within or defining a portion of the one or more housings, the first guide plate being positioned adjacent the first receiving region and extending in the transverse direction along at least a portion of the width of the conveyor assembly; and
at least one first guide vane extending from the first guide plate into the crop passage on the first transverse side of the first rotor axis, each first guide vane extending from a leading edge that is relatively far from the first receiving region to a trailing edge that is relatively close to the first receiving region, and being oriented at a respective angle relative to the feeder flow direction with the trailing edge closer to the first rotor axis, in the transverse direction, than the leading edge.

13. The agricultural combine of claim 12, wherein the at least one first guide vane comprises a plurality of first guide vanes.

14. The agricultural combine of claim 13, wherein the plurality of first guide vanes are each oriented at a respective angle relative to the feeder flow direction, with the respective angle of a first guide vane that is most distant from the first rotor axis being greater than the respective angle of a first guide vane that is closest to the first rotor axis.

15. The agricultural combine of claim 12, further comprising at least one second guide vane extending from the first guide plate into the crop passage on the second transverse side of the first rotor axis, each second guide vane extending from a leading edge that is relatively far from the first receiving region to a trailing edge that is relatively close to the first receiving region, and being oriented at a respective angle relative to the feeder flow direction with the leading edge closer to the first rotor axis, in the transverse direction, than the trailing edge.

16. The agricultural combine of claim 12, further comprising at least one third guide vane extending from the first guide plate into the crop passage on the second transverse side of the first rotor axis, each third guide vane extending from a leading edge that is relatively far from the first receiving region to a trailing edge that is relatively close to the first receiving region, with the leading edge and trailing being equidistant to the first rotor axis in the transverse direction.

17. The agricultural combine of claim 12, wherein the at least one first guide vane is movably mounted to the first guide plate, and movable between a first position in which the at least one first guide vane extends a first distance into the crop passage, and second position in which the at least one first guide vane extends a second distance into the crop passage or is removed from the crop passage.

18. The agricultural combine of claim 12, wherein the at least one first guide vane is movably mounted to the first guide plate to change the respective angle relative to the feeder flow direction between a first angle in which the leading edge and the trailing edge are offset from each other relative to the transverse direction by a first distance, and a second angle in which the leading edge and the trailing edge are offset from each other relative to the transverse direction by a second distance, the second distance being greater than the first distance.

19. The agricultural combine of claim 12, wherein at least a portion of the first guide plate is located below the conveyor assembly or below a rotary beater located between the conveyor assembly and the first rotor.

20. The agricultural combine of claim 12, further comprising a second rotor located in the one or more housings adjacent to the first rotor along the transverse direction, the second rotor being mounted to rotate about a second rotor axis, the second rotor extending along the second rotor axis from a proximal second rotor end that is relatively close to the conveyor assembly to a distal second rotor end that is relatively far from the conveyor assembly, the second rotor having one or more respective inlet vanes located at the proximal second rotor end, the one or more inlet vanes being positioned to receive a second portion of the flow of crop material from the conveyor assembly in a second receiving region located below the second rotor axis, each of the one or more inlet vanes having a respective leading edge that, upon rotation of the second rotor about the second rotor axis, travels towards the second receiving region on a first transverse side of the second rotor axis and away from the receiving region on a second transverse side of the second rotor axis;
a second guide plate located within or defining a portion of the one or more housings, the second guide plate being positioned adjacent the second receiving region and extending in the transverse direction along at least a portion of the width of the conveyor assembly; and at least one fourth guide vane extending from the second guide plate into the crop passage on the first transverse side of the second rotor axis, each fourth guide vane extending from a leading edge that is relatively far from the second receiving region to a trailing edge that is relatively close to the second receiving region, and being oriented at a respective angle relative to the feeder flow direction with the trailing edge closer to the second rotor axis, in the transverse direction, than the leading edge.

* * * * *